United States Patent [19]

Muller

[11] 4,413,323
[45] Nov. 1, 1983

[54] DIGITAL SYMBOL GENERATOR WITH SYMBOL ERROR CHECKING

[75] Inventor: Hans R. Muller, Kirkland, Wash.

[73] Assignee: Sundstrand Data Control, Inc., Redmond, Wash.

[21] Appl. No.: 175,399

[22] Filed: Aug. 5, 1980

[51] Int. Cl.³ ............................................. G06F 3/153
[52] U.S. Cl. .................................. 364/521; 340/730; 340/739; 340/791
[58] Field of Search ............... 364/521, 718, 719, 721; 358/103; 340/727, 730, 739, 740, 742, 747, 791

[56] References Cited

U.S. PATENT DOCUMENTS

| | | | |
|---|---|---|---|
| 3,510,865 | 5/1970 | Callahan et al. | 340/740 X |
| 3,786,482 | 1/1974 | Puckett, Jr. et al. | 340/739 |
| 3,813,528 | 5/1974 | Blanding | 364/721 X |
| 3,821,729 | 6/1974 | Schultze | 340/739 |
| 3,921,163 | 11/1975 | Giraud et al. | 340/727 |
| 3,952,297 | 4/1976 | Stauffer et al. | 340/740 |
| 4,023,027 | 5/1977 | Strathman et al. | 364/521 |
| 4,056,713 | 11/1977 | Quinn | 340/742 X |
| 4,115,863 | 9/1978 | Brown | 364/521 |
| 4,146,925 | 3/1979 | Green et al. | 364/521 |
| 4,228,510 | 10/1980 | Johnson et al. | 364/521 |
| 4,247,843 | 1/1981 | Miller et al. | 340/747 X |

*Primary Examiner*—Jerry Smith
*Attorney, Agent, or Firm*—Wood, Dalton, Phillips, Mason & Rowe

[57] ABSTRACT

A digital symbol generator for developing analog deflection voltages to drive a cathode ray tube display forming a plurality of symbols from successive blanked and unblanked vectors rotatable about an arbitrary angle of rotation. Each vector is specified by a binary representation of its polar coordinates including vector angle and length, rotation being accomplished by digital addition of the vector angle and angle of rotation. A line length counter generates a pulse train the number of pulses of which is proportional to vector length and the frequency of which is greater for blanked vectors than for unblanked vectors so that blanked vectors are drawn at a faster rate. Symbol error checking is accomplished by a vector closure technique wherein the symbology end point is measured at the output of the symbol generator and compared with the independently calculated true end point.

6 Claims, 21 Drawing Figures

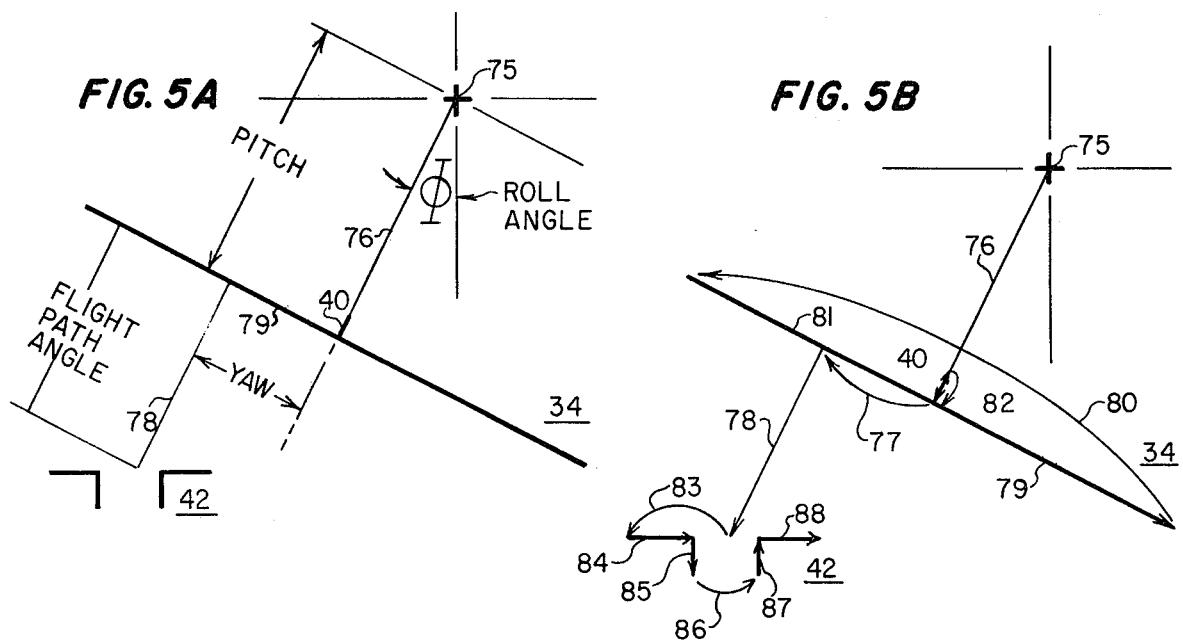
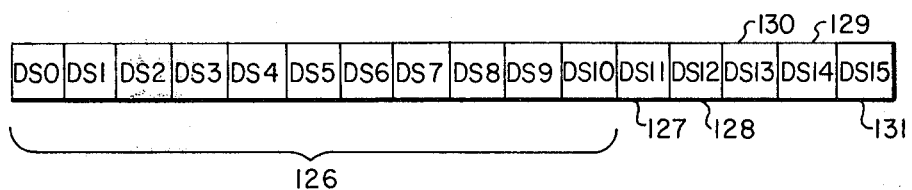
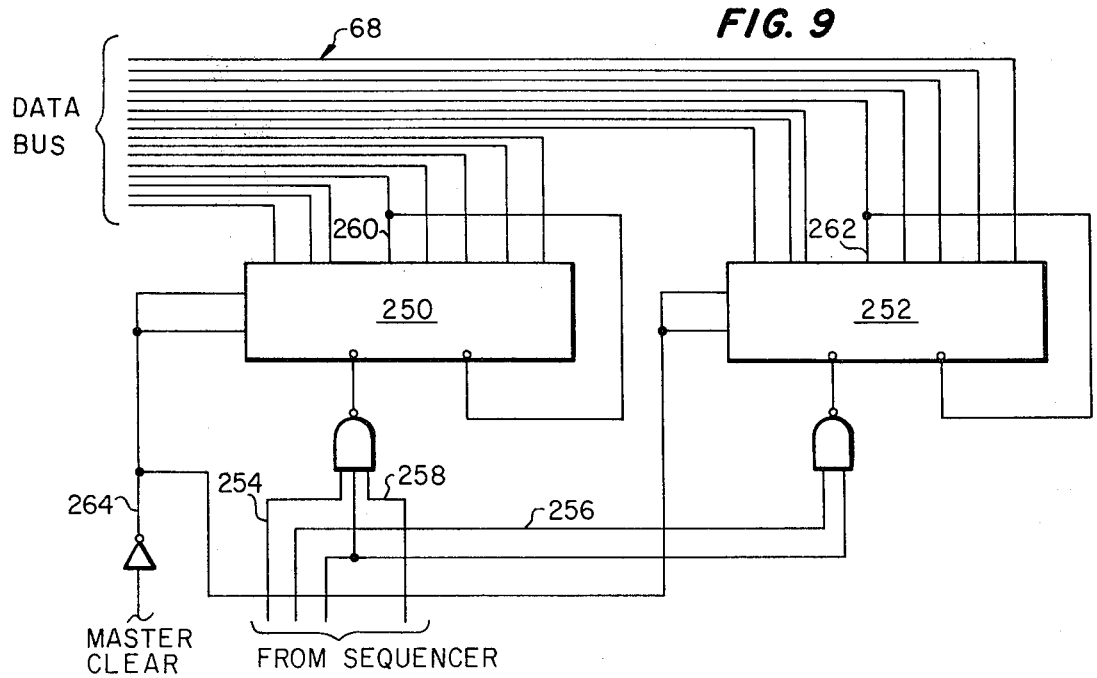

DIGITAL SYMBOL GENERATOR WITH SYMBOL ERROR CHECKING

BACKGROUND OF THE INVENTION

This invention relates to a digital symbol generator with symbol error checking for developing analog deflection voltages to drive a cathode ray tube display, forming a plurality of symbols from successive blanked and unblanked vectors rotatable about an arbitrary angle of rotation.

Digital symbol generators have been known in which the vectors forming the symbol may be rotated. The data specifying individual vectors has consisted of either polar coordinates, angle and length information or cartesian coordinates, starting and end point information. Where polar coordinates have been used, the angle destination has been a fixed binary code resulting in a limited number of angles at which the vectors can be drawn or about which the vectors may be rotated. Where cartesian coordinates have been used, rotation of a vector has been accomplished either by complex digital transformation of the cartesian coordinates or analog devices which rotate the entire symbology at the input to the display.

A computer typically supplies a digital symbol generator with the input data required to specify the length and orientation of the vectors forming a symbol. Where the computer supplies both starting point and end point data for each vector, the symbol generator is highly dependent upon the computer for input information. Other symbol generators include a memory for storing vector data. The memory is then incrementally addressed to sequentially read out the data required for each vector forming a symbol. This type of symbol generator is less dependent upon the computer, however, when changes in the symbology are required the memory must be reprogrammed which is very costly and time consuming.

Digital symbol generators further utilize constant speed stroke writing techniques to ensure uniform brightness of the displayed symbols. One such technique is to normalize the x and y axis displacements by means of shift registers. Since all vectors generated by this method are drawn at the same speed, effective drawing time is wasted where the vectors are not visible on the display.

One of the many symbol generator uses is in an aircraft to display flight guidance information on a pilot display unit. This requires extremely accurate symbology to ensure the safe operation of the aircraft. Symbol error checking has been accomplished in the past by analog error rate processors which are typically very costly.

SUMMARY OF THE INVENTION

In accordance with the present invention, the disadvantages of prior digital symbol generators as discussed above have been overcome. The digital symbol generator develops analog deflection voltages to drive a cathode ray tube display forming a symbology. The CRT beam is deflected to trace successive straight line segments or vectors, the beam being unblanked during the tracing of vectors forming the symbology and blanked during other vectors.

All vectors are specified in polar coordinates by binary values representing the vector angle $\Phi$ and the vector length $l$. This binary representation of the angle and length allows vectors to be drawn at any arbitrary angle or length not being limited by a fixed coded representation thereof.

Symbols may be either fixed or variable. For fixed symbols, the vector data words including the binary representation of angle and length for each vector of the symbol are sequentially stored in a symbology PROM. A computer transmits an initial symbol address to an address counter whereupon a sequencer increments the counter as each vector is drawn to sequentially read out data words from the PROM until the last vector of the symbol is detected. After the initial symbol address is transmitted to the symbol generator, no computer intervention is needed until the entire symbol has been completed. For variable symbols, the vector data words including angle and length information are supplied directly from the computer to the symbol generator so that the symbol generator is not limited by the fixed number of symbols stored in the symbology PROM. This combination of fixed and variable symbols increases the flexibility of the symbol generator while maintaining the dependency upon the computer at a minimum.

A line length counter receives length data from either the symbology PROM for fixed symbols or directly from the computer for variable symbols. The counter counts down under a clock control until a zero is reached thereby generating a series of pulses, the number of which is equal to the binary representation of length loaded into it. The rate of the clock input to the counter is greater for blanked vectors than for unblanked vectors so that blanked vectors may be drawn four times the normal speed. Increasing the drawing rate for blanked vectors minimizes the effective drawing time of the symbology. However, uniform brightness of the visible symbols is ensured since all visible vectors are drawn at a constant speed.

Rotation of the symbol is accomplished by digitally adding binary values representing the angle of rotation and the vector angle. The resulting sum represents the actual angle at which the vector is to be drawn and also forms the address of a sin/cosine converter. The output of the converter is a binary number corresponding to sin $\Phi$ and cos $\Phi$. X and y integrators combine this angle information with the pulse train from the line length counter representing vector length to form composite digitial signals. These signals are then sent to digital to analog converters to develop the x and y deflection voltages which drive the CRT display.

The computer not only supplies control, data and address information to the symbol generator unit, but also makes possible a monitoring scheme of the system. The computer operates under the control of a constant program path wherein conditional load instructions are utilized in lieu of conditional branching. The computer functions to execute all of the programmed instructions every iteration, issuing to the symbol generator the same number and types of instructions regardless of the particular mode of operation. Those symbols which are not part of a particular symbology mode are drawn blanked or are replaced by blanked connecting vectors or dummy symbols to minimize the time required to complete the symbol sequence. The symbol generator includes segment counters which keep a running count of the number of blanked and unblanked vectors drawn. This count information is transmitted back to the computer to ensure that all of the vectors were generated.

Symbol error checking is also accomplished by a vector closure technique wherein each symbol is vectorally added to the previous symbol. The symbology end point is measured at the output of the digital to analog converters and is converted to a digital number while the true end point is calculated independently by the computer using vector addition. These two digital values are compared and if they are not equal, an indication of error is displayed.

Other objects and features of the invention will be apparent from the following description and from the drawings.

BRIEF DESCRIPTION OF THE DRAWINGS

FIG. 5A-B is an illustration of the blanked and unblanked vectors generated forming two symbols;

FIG. 7 is an illustration of a 16-bit data word specifying a vector;

FIG. 9 is a schematic of the segment counters;

Figure 1:
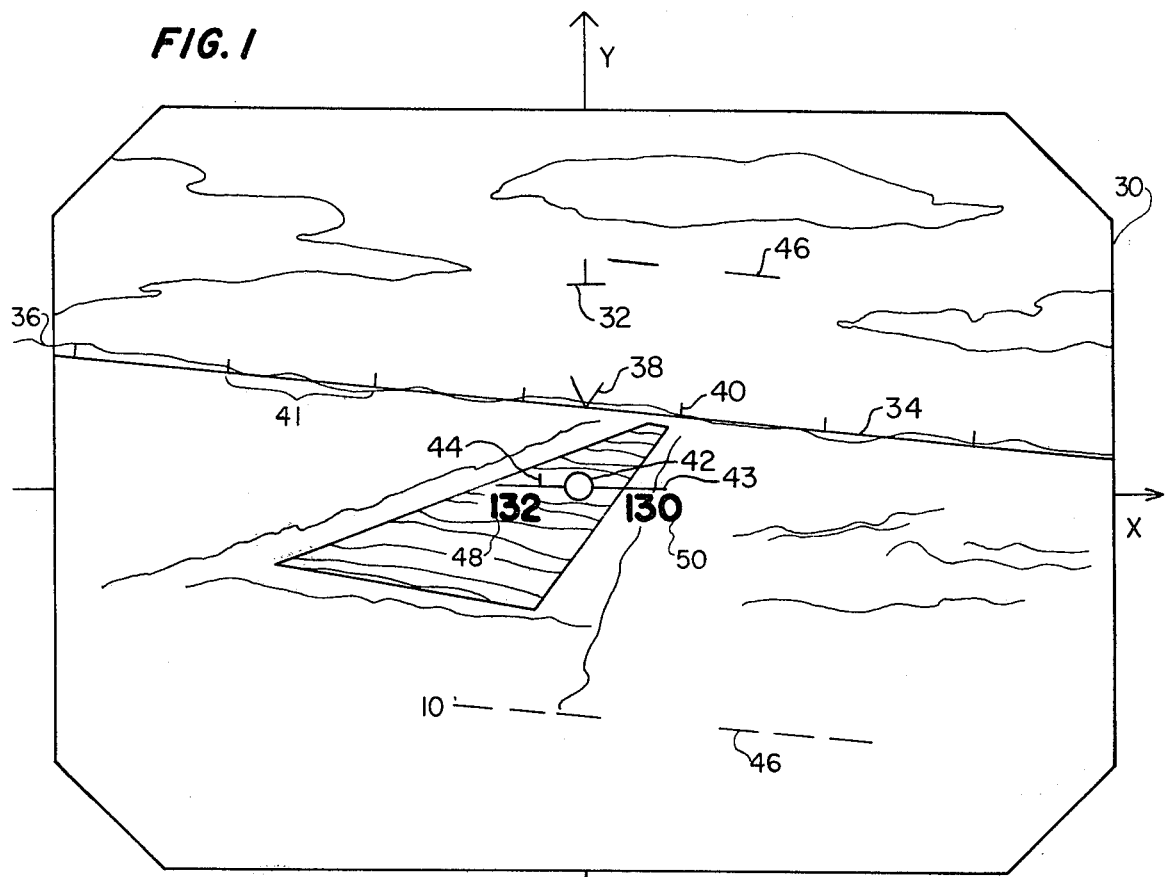
FIG. 1 is an illustration of generated symbols displayed on a headup display unit having the real world as a background.

An example of the displayed symbols generated by the symbol generator of the present invention is shown in FIG. 1. The generated symbols are displayed on a headup display unit for an aircraft with the real world as a background. The headup display unit includes an acrylic block 30 which swings down into the pilot's field of view from an overhead mount, providing a display for the generated images that are projected onto the block from a CRT.

The symbols depicted are typical of those visible on the display for a Non-ILS (Instrument Landing System) approach. Other typical modes of operation may include an ILS approach for categories I, II and III, a take-off/go-around mode, and a take-off/roll mode. Further display modes may be utilized as desired. For each mode, appropriate symbols will be visible on the display. The symbol generator is not limited to any particular symbology or operating mode. The computer issues the same number and type of instructions to the symbol generator, for all modes of operation, during each iteration by means of a constant program path. However, only those symbols which form part of a particular display mode will be visible, the remaining symbols being blanked or replaced by blanked vectors or dummy signals.

The symbols shown in FIG. 1 include a pitch reference symbol 32 which is located in a fixed position 7° above the center of the headup display. The pitch reference symbol 32 represents the fuselage reference line of the airplane and in relation to a horizon line symbol 34, gives an indication of pitch and roll attitude. The horizon line symbol 34 represents the horizontal plane perpendicular to the earth, radial through the airplane and at low altitudes, approximately overlays the true horizon 36. The vertical displacement of the horizon line 34 relative to the pitch reference symbol 32 represents aircraft pitch attitude, and angular displacement represents the aircraft roll attitude. An aircraft heading symbol 38 is positioned above and in the center of the horizon line 34 and when used in conjunction with a course reference symbol 40, it provides an indication of course error or heading error. The course reference symbol 40 consists of a vertical marker together with smaller tick marks 41 at 5° intervals to the left and right and is positioned along the top of the horizon line 34. The position of the course reference symbol 40 is determined by the deviation between the selected course and actual aircraft heading.

An aircraft symbol 42 indicates the airplane's position, flight path or trend relative to the "real world" depending upon the mode of operation. For example, in the approach mode as shown, the airplane symbol 42 represents a selected flight path relative to the horizon. The airplane symbol 42 is off-set from the horizon line symbol 34 by an amount equivalent to the selected flight path angle. Thus, if the pilot selects a 3° flight path, the airplane symbol will drop 3° below the horizon line. The wings 43 of the aircraft symbol 44 are not roll stabilized, thus indicating roll angle with respect to the horizon line 34. A fast/slow symbol 44 appears as a bar perpendicular to the lefthand wing of the airplane symbol 42 and indicates whether air speed is too fast or too slow with respect to a reference speed computed by a digital flight guidance computer. When air speed is too fast, symbol 44 appears above the airplane symbol 42, and when too slow, below the airplane symbol. The length of the fast/slow symbol 44 varies depending upon the magnitude of the speed deviation. A pitch ladder symbol 46 provides a quantitative measure of pitch attitude, marked at a 5° increment above the horizon line 34 and at a 10° increment below horizon line 34. This symbol is fixed vertically relative to the horizon line 34 which corresponds to the zero reference point of the scale.

An indication of air speed is provided by a digital readout 48 which indicates the computer air speed from the airplane's computer and changes in one knot increments. An altitude readout 50 is displayed in units of feet and varies between one and four digits.

As shown in this Non-ILS approach scenario, the pilot is maneuvering the airplane in a left roll to line up the airplane symbol with the runway center line. The airplane is at an altitude of 130 feet and has air speeed of 130 knots. The pitch attitude is estimated by the vertical displacement between the pitch reference 32 and the horizon line 34 together with the pitch ladder 46 and is approximately 4°. The selected flight path angle is approximated by the perpendicular displacement between the horizon line and the center of the airplane symbol.

The airplane in this case is below the horizon line by a distance equivalent to a −3° flight path.

Course error is determined by the displacement along the horizon line between the aircraft heading symbol 38 and the reference symbol 40 and is approximately 3°. The roll angle is estimated by referencing the airplane symbol 42 to the horizon line. The angular displacement between these two symbols as shown is approximately equal to a roll angle of −5°. In this scenario, the pilot would continue the left turn until the airplane symbol is aligned with the runway center line.

Figure 2:
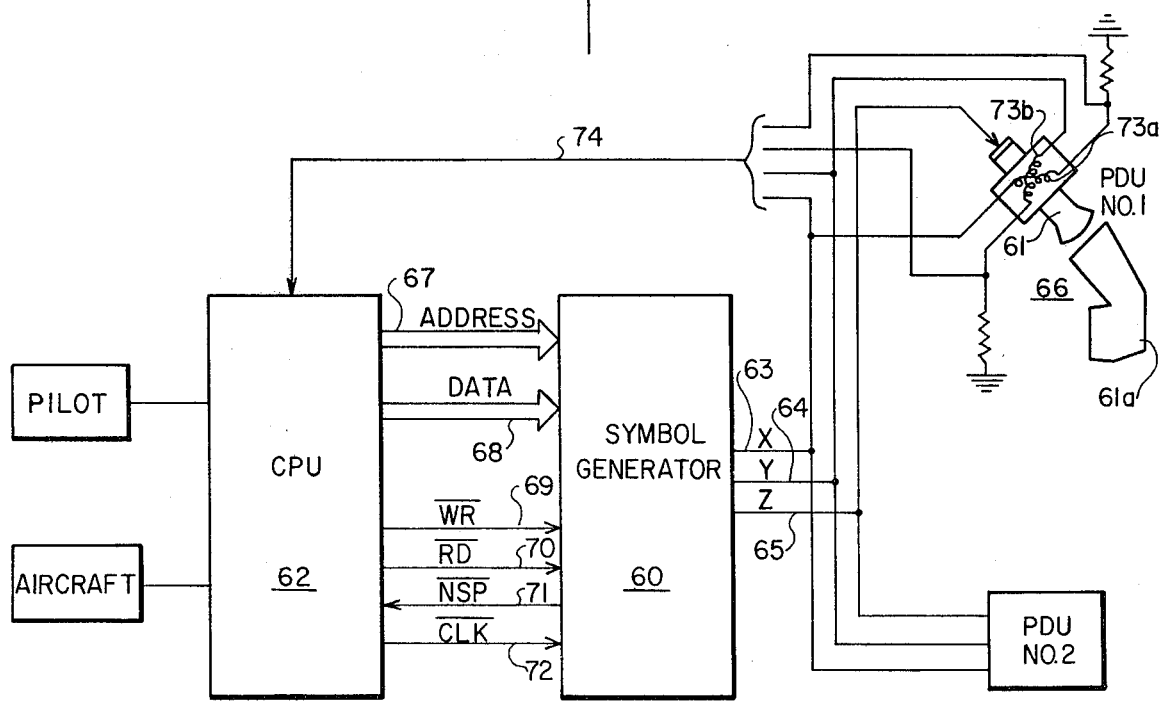
FIG. 2 is a block diagram of the headup display showing the interconnection of the computer, symbol generator and display units.

As shown in FIG. 2, the symbol generator unit 60 of the present invention is part of a memory mapped input-/output system of a digital computer 62. Instructions are issued to the symbol generator 60 by reading from selected memory locations in computer 62. In response to these instructions, the symbol generator develops x and y analog deflection voltages 63 and 64 and z axis or blanking signals 65 to drive a cathode ray tube display 61, included in the pilot's display unit 66 for a headup display. The image is presented to the pilot through optics 61a. The symbol generator could, of course, be used in other display systems.

The computer 62 receives inputs related to the display from the pilot, as intended flight path angle for approach, and from the aircraft, as angle of attack, pitch and roll angles and mode selection logic signals. The symbol generator 60 is connected with computer 62 through address and data buses 67, 68 respectively and through control connections for Write (WR) 60, Read (RD) 70, and Next Symbol Please (NSP) 71. The computer also provides a clock (CLK) signal at 72.

The x and y analog deflection signals at 63, 64 from symbol generator 60 are connected with deflection coils 73a, 73b of CRT 61. The blanking signal at 65 is applied to an appropriate element of the CRT. Vector end point signals from the symbol generator 60 and from the pilot display unit 66 are coupled with the computer 62 as indicated at 74, for comparison with the calculated end point.

The computer 62 selects the proper operating mode for the symbol generator unit 60 in accordance with pilot or aircraft inputs and operating on a fixed program sequence or constant program path develops input information which is transmitted to the symbol generator 60. This information selects the proper set of symbols to be visible on the display units 66 and establishes the position of the symbols. The constant program path is such that the computer issues to the symbol generator the same type and number of instructions during each iteration cycle. The program utilizes a conditional load instruction in lieu of conditional branch instructions to conditionally transfer the data resulting from execution of an intruction into an output register. The symbol generator instruction issued by the CPU may contain an address portion and a data portion. The address portion determines the type of instruction, and the data portion the nature of the symbol. For example, to paint a numeral, the address portion of the instruction is the same regardless of the symbol. The data portion of the instruction identifies the numeral. Selection of appropriate data and transfer to a counter or register is referred to as "conditional loading". The constant program path makes possible an effective monitoring scheme for the CPU.

Computer 62 also includes a symbol error checking program which calculates the true end point of the symbology for both the symbol generator and the display unit using a vector addition technique. The symbol error checking program will be discussed in greater detail below.

Inputs to the symbol generator unit 60 include an address signal received from computer 62 which determines the function the symbol generator is to execute. Data input received on a data bus 68 by the symbol generator unit identifies the symbol to be drawn. For example, an instruction for a fixed symbol—"draw airplane"—instructs the symbol generator to load a PROM counter with the starting address of the programmed airplane symbol data. An instruction—"draw a line"—includes line length information which is loaded in a line length latch. The data also identifies angles; and specifies the vector to be blanked. Upon receipt of a Write signal on line 69, symbol generator 60 accepts the address and data on buses 67, 68. When a Read signal is received on line 70, the symbol generator outputs data on data bus 68 to be transmitted back to computer 62. The symbol generator unit 60 requests further instructions by transmitting a "Next Symbol Please" NSP, signal on line 71 to the computer 62. No computer intervention is needed until requested by receipt of the NSP signal.

Symbol generator unit 60 develops the appropriate x and y axis analog deflection signals and blanking (z axis) signals to drive the CRT displays included in the pilot display units 66. Straight line segments or vectors are drawn in succession in a continuous manner to form the symbology. Vectors may be drawn either blanked or unblanked wherein blanked vectors are drawn approximately four times faster than unblanked vectors to minimize the effective drawing time. Unblanked vectors are drawn at a constant speed to provide uniform brightness of the displayed symbols.

Figure 3:
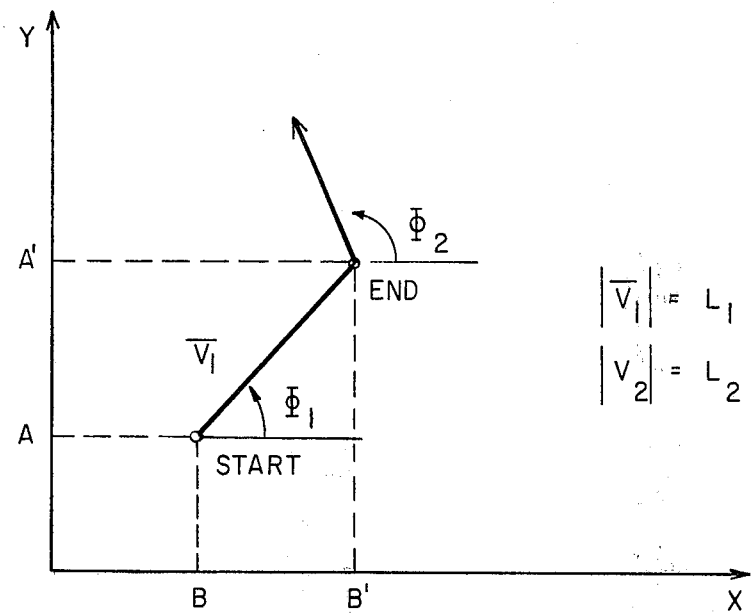
FIG. 3 is a graphical representation of two generated vectors.

Typical vectors $\bar{v}_1$ and $\bar{v}_2$ painted on the CRT are shown in FIG. 3. A vector is defined in polar coordinates by binary values representing the vector segment angle $\Phi$ and magnitude or length l. Each vector can be resolved into components along the x and y axes. The components of $\bar{v}_1$ are $$x_1 = l_1 \cos \Phi$$

$$y_1 = l_1 \sin \Phi$$

Figure 4:
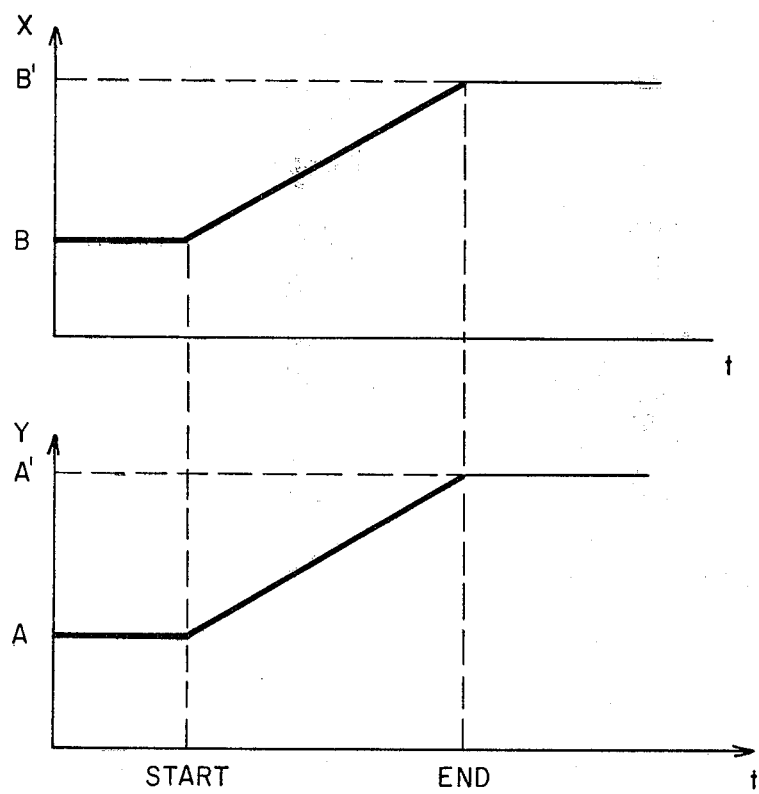
FIG. 4 is a graphical representation of the x and y axis analog deflection voltages.

In order to draw the vector $\bar{v}_1$, symbol generator 60 produces the x and y deflection waveforms shown in FIG. 4. Digital integrators for performing this function are described below.

FIG. 5A shows the horizon line symbol 34 and the airplane symbol 42 with an indication of their relationship to the aircraft flight condition and with some of the connecting vectors used in drawing the display. FIG. 5B illustrates in more detail the sequence of vectors which draw the display.

In FIG. 5A, beginning at a starting point 75, which may be the center of the screen of the CRT, a blanked connecting vector 76 is drawn at the aircraft roll angle $\Phi$ and having a length related to the aircraft pitch angle. Horizon line 34 is drawn at right angles to blanked vector 76. A blanked connecting vector 77 having a length related to yaw or course error provides an offset from the course reference symbol 40 at the center of the horizon line. Blanked connecting vector 78 from the end of connecting vector 77 and at right angles to horizon line 34 extends to the center of the airplane symbol 42 and has a length which may, for example, be a function of aircraft flight path angle.

In FIG. 5B, arrows indicate the direction in which the vectors are drawn. Some of the blanked connecting vectors are shown by curved lines for clarity. From starting point 75, blanked vector 76 is drawn. This is followed by unblanked vector 79, blanked vector 80 and unblanked vector 81 forming the horizon line 34. Course reference symbol 40 is drawn next, followed by blanked vectors 82, 77 and 78 to the midpoint of the aircraft symbol 42. Blanked connector vector 83 is followed by vectors 84, 85 forming one-half of the aircraft symbol. Then blanked connecting vector 86 and vectors 87, 88 complete the aircraft symbol.

Figure 6A:
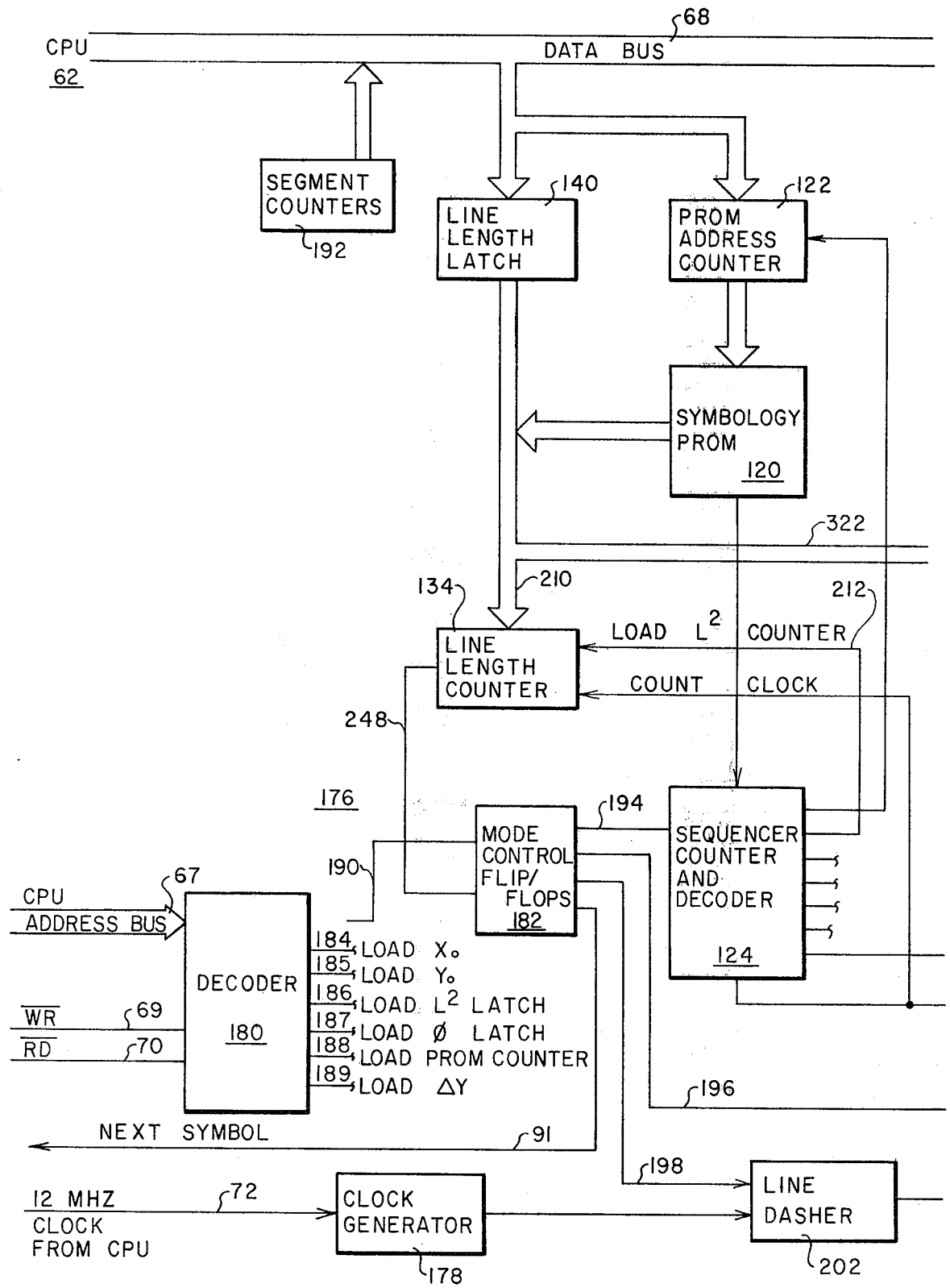
FIG. 6A-B is a block diagram of the symbol generator unit.
Figure 6B:
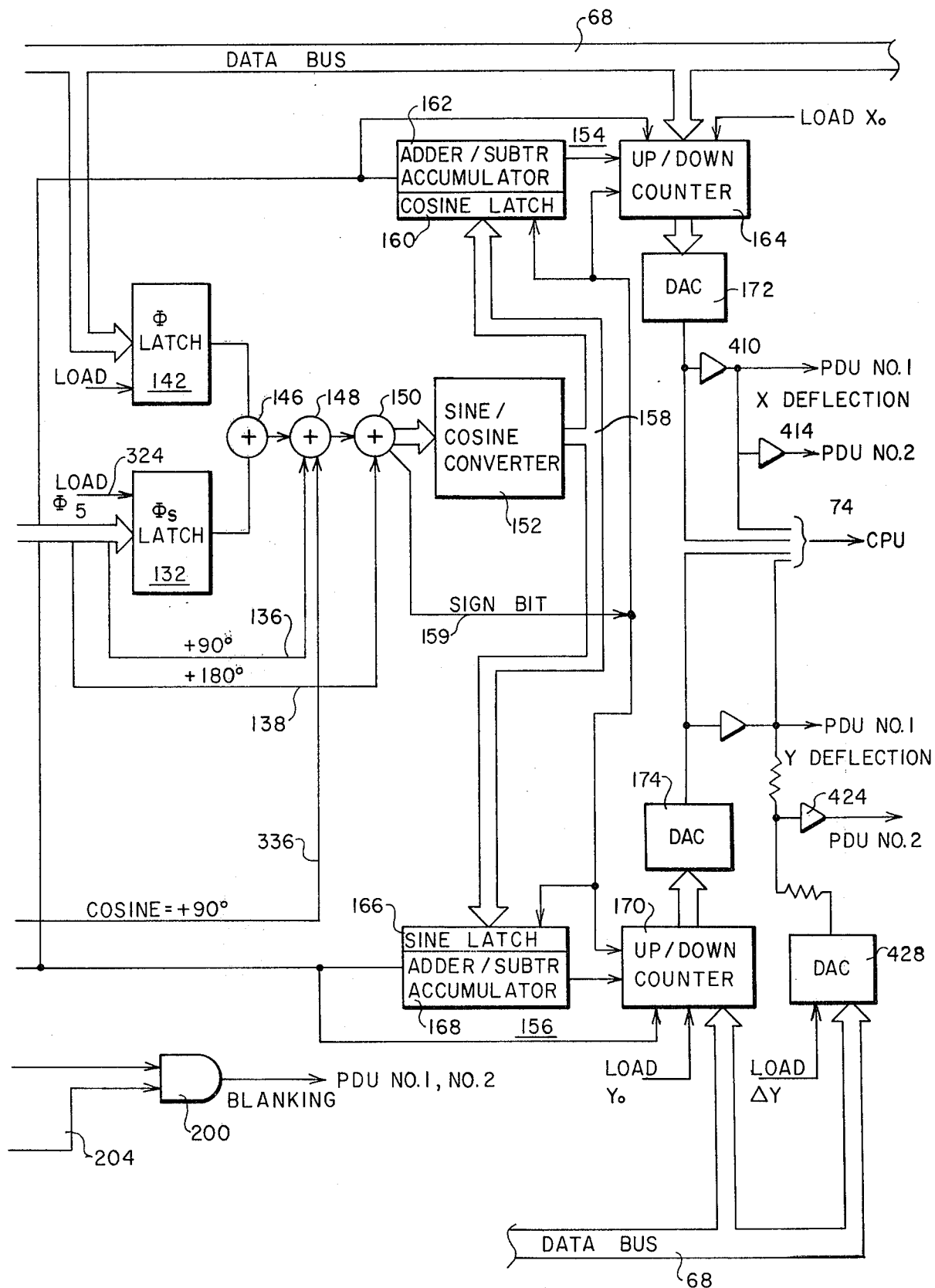

The generation of fixed and variable symbols by the symbol generator unit 60 will now be described in relationship to FIGS. 6A and 6B. For fixed symbols, vector data words including the binary representation of angle and length are stored in sequence for each consecutive vector forming the symbol in a symbology PROM 120. As an example, for the horizon line symbol 34 of FIG. 5, the first vector words stored in symbology PROM 120 specify the angle and length of vector 79. The second group of words stored specifies the angle and length for vector 80 and so on with the last word stored for the horizon symbol 34 specifying vector 82. When a fixed symbol is to be drawn, the computer 62 transfers the initial address of that symbol onto data bus 68 which is then loaded into a PROM address counter 122. The PROM address counter 122 is incremented by a sequencer counter 124 to read out the data words for the first vector to be drawn by the remainder of the symbol generator unit 60. After that vector is drawn, the sequencer counter 124 increments the PROM address counter to read out the data word for the second vector to be drawn and so on until the last vector comprising the symbol is detected and drawn on the CRT display.

The PROM's in the symbology PROM 120 together form a 16-bit wide field. Each PROM is 8 bits wide and up to 2,048 words deep. The vector angle representation is a 12-bit binary number and is made on the basis of 360° = 4096 counts (decimal). A positive angle is in the counterclockwise sense. The length representation is also a 12-bit binary representation based on 4096 counts = 72° optically, i.e. about the center of deflection of the CRT. The binary representation of angle allows vectors to be drawn at any arbitrary angle not being limited by a fixed coded representation thereof. FIG. 7 shows the significance of each of the bits. The first 11 bits 126 store the binary number representing either the angle or length of the vector depending upon bit 127. If bit 127 has a value of 1, the data in bits 126 represent the vector angle. If bit 127 has a value of 0, the data represented in bits 126 designates length. Bit 128 is an end-of-symbol (EOS) bit and when zero, designates that this is the last vector comprising the symbol. Bits 129 and 130 designate right angle data. For respective values of bits 129 and 130 of 0, 0; 0, 1; 1, 0 and 1, 1, the right angles 0°, 90°, 180° and 270° are specified. Bit 131 designates the vector blanking information. If bit 131 has a value of 1, the vector is to be drawn unblanked and if it has a value of 0 it is to be drawn blanked.

Vectors generated by the symbol generator unit must have a specified angle and length so that two 16-bit words are normally required to describe the vector, one representing angle, the other representing length. If bits 126 designate an angle the data word will be read out of symbology PROM 120 to a segment angle latch 132. If bits 126 represent length, the data word will be read out from the symbology PROM 120 into a line length counter 134. However, vectors may be specified by a single 16-bit data word where the vectors are to be displayed at right angles to each other. The 16-bit data word will contain length data in the first 10 bits 126 and angle data in the right angle bits 129 and 130. Where right angle data is used, the data bits 126 designating length are still loaded into the line length counter 134 but a signal appears on lines 136 or 138 respectively designating 90° or 180°, or a signal may appear on both lines 136 and 138 designating 270° for the angle. The use of right angle data saves memory space in the symbology PROM 120 since many of the vectors forming a symbol will be at right angles.

For variable vectors, computer 62 transmits both length data and angle data to data bus 68, the data words for these vectors having a format similar to that shown in FIG. 7 for vector data words stored in symbology PROM 120. If the data specifies vector length, it will be loaded directly from the computer 62 into a line length latch 140. If the data specifies the angle of the variable vector, it will be loaded from computer 62 on data bus 68 into an angle latch 142. Variable vectors may be drawn by a single instruction by utilizing the right angle bits 129 and 130 if the relative angle to the roll angle is 0°, 90°, 180° or 270°. If the vector is not at right angles to the roll angle, the angle of the vector must be loaded into latch 142.

The line length counter 134 receives length data from either the symbology PROM 120 for fixed symbols or from the line length latch 140 for variable symbols. The counter counts down under a clock control until zero is reached thereby generating a series of pulses, the number of which is equal to the binary representation of length loaded into it. The rate of the clock input to the counter is greater for blanked vectors than for unblanked vectors so that blanked vectors may be drawn four times the normal speed.

When a symbol or vector is to be rotated, computer 62 transfers a binary representation of the roll angle or angle of rotation onto bus 68 into the angle latch 142. Rotation of a fixed symbol is accomplished by adding the binary value representing the roll angle stored in angle latch 142 with the segment angle stored in segment angle latch 132 in a digital adder 146. If right angle data is utilized, the roll angle from latch 142 is added to the binary representation of 90° and 180° on respective lines 136 and 138 by digital adders 148 and 150, respectively. For variable vectors, if right angle data is used, adders 148 and 150 sum the right angle data with the roll angle from latch 142. If right angle data is not used, the angle stored in latch 142 represents the arbitrary angle at which the vector is to be drawn and after that vector is completed, latch 142 is reset by the computer to the roll angle of the aircraft. Latch 142 is set to zero when a non-roll stabilized symbol is drawn. The resulting sum from digital adders 146, 148 and 150 represents the actual angle of the vector to be drawn and also forms the address of a sine/cosine converter 152.

The output of the sine/cosine converter 152 is a binary number representing the cosine or the sine of the actual angle representation input to converter 152. The cosine and sine of the actual angle are transmitted to x and y integrators 154 and 156, respectively, on bus 158. A sign designation is also sent to each of the integrators 154 and 156 on line 159 and will vary depending upon the orientation of the vector.

The x integrator 154 includes a cosine latch 160, an adder/subtractor accumulator 162 and an up/down counter 164. Similarly, the y integrator 156 includes a sine latch 166, an adder/subtractor accumulator 168 and an up/down counter 170. The up/down counters 164 and 170 combine the angle information from the sine/cosine converter 152 via accumulator adders 162 and 168 with the pulse train generated by the line length counter 134 representing vector length and also a digital representation of the starting point of the symbol $x_0$, $y_0$ supplied to the up/down counter from the computer 62 on bus 68 to form composite digital signals. These signals are then sent to digital to analog converters 172 and 174 to develop respective x and y deflection voltages which drive the cathode ray tube displays included in the pilot display units 66.

The core of the symbol generator sequencer generally designated 176 consists of a master clock generator 178, a sequencer counter 124, an address decoder 180 and mode control flip/flops 182. The sequencer 176 oversees the set up of the internal registers of the symbol generator unit for vector generation and controls the writing process. Only two instructions will cause a vector writing sequence to be initiated. They are the load line length latch and load PROM counter signals generated by decoder 180.

The master clock generator 178 is a divide-by-sixteen counter. It receives the 12 MHz main clock signal from computer 62 and divides it into 1.5 MHz for clocking unblanked vectors, 3 MHz to operate the sequence logic of sequencer counter 124 and 6 MHz for clocking blanked vectors. The sequencer counter 124 has states 1-7 which are used to set up the symbol generator registers such as the segment angle latch 132, the line length counter 134 and so on, whereas states 0 and 8 are "holding" states. The decoder 180 acts as "steering logic" and sends load instructions to various symbol generator registers. The mode control flip/flops 182 control sequence enabling and ending, blanking and clock gating and also generate the NSP signal which is sent back to computer 62 on line 82.

Decoder 180 decodes the addresses received on bus 67 from computer 62 and outputs various load instructions on lines 184 through 189. These load instructions include the following: load $x_0$, load $y_0$, load line length latch, load $\Phi$ latch, load PROM counter and load $\Delta y$. On line 190, the decoder 180 transmits a master clear signal whenever a Write signal is present on line 69. The master clear instruction from the CPU clears the sine and cosine latch, the accumulators and up/down counters of the x and y integrators 154 and 156. It also resets the $\Phi$ latch 142 and the mode control flip/flop 182. Upon receipt of the master clear instruction on line 190, the contents of segment counters 192 are cleared. The segment counters 192 keep a running count of the number of blanked and unblanked vectors that have been generated by the symbol generator and perform a monitoring function to indicate failure. Before the segment counters 192 are cleared by the master clear instruction from the CPU via decoder 180, the CPU reads the contents of the counters which are transmitted to computer 62 on data bus 68.

One of the mode control flip/flops 182 outputs a sequence enable signal on line 194 which is sent to sequencer counter 124 to initiate the sequence states 0 through 8. Mode control 182 receives blanking information from the data stored in the line length counter 134 and outputs paint or blank discretes and dash discrete on lines 196 and 198, respectively. If a vector or symbol is to be drawn blanked, a high signal is present on line 196 which is input to a blanking circuit 200. The second input to blanking circuit 200 is an input signal received from a line dash generator 202 on line 204. Line dash generator 202 receives a dash signal on the dash sync line 198 and clock signals from the clock generator 178 to produce a periodic high/low signal which is output to blanking circuit 200. The outputs from blanking circuit 200 are sent to the pilot's display units 66 to turn off the CRT beam whenever the vector is to be drawn blanked and to turn on the beam when the vector is to be drawn unblanked or dashed.

Symbol error checking is accomplished by a vector closure technique wherein each symbol is vectorially added to the end point of the last symbol or vector. This technique is possible since the vectors comprising the symbology are drawn in a continuous manner, the starting point of one vector being the end point of the previous vector drawn. Analog signals representing the x and y coordinates of the end point of the symbology are derived at the output of the symbol generator (from digital to analog converters 172, 174) and from the symbol displays. These signals are coupled to the computer 62 as described in connection with FIG. 2. Computer 62 independently calculates the true end point of the symbology using vector addition. The true end point calculated by computer 62 and the symbology end point received from the symbol generator and display units are compared by the computer and if not equal, an error symbol is displayed.

DETAILED DESCRIPTION OF THE SYMBOL GENERATOR UNIT

Figure 8:
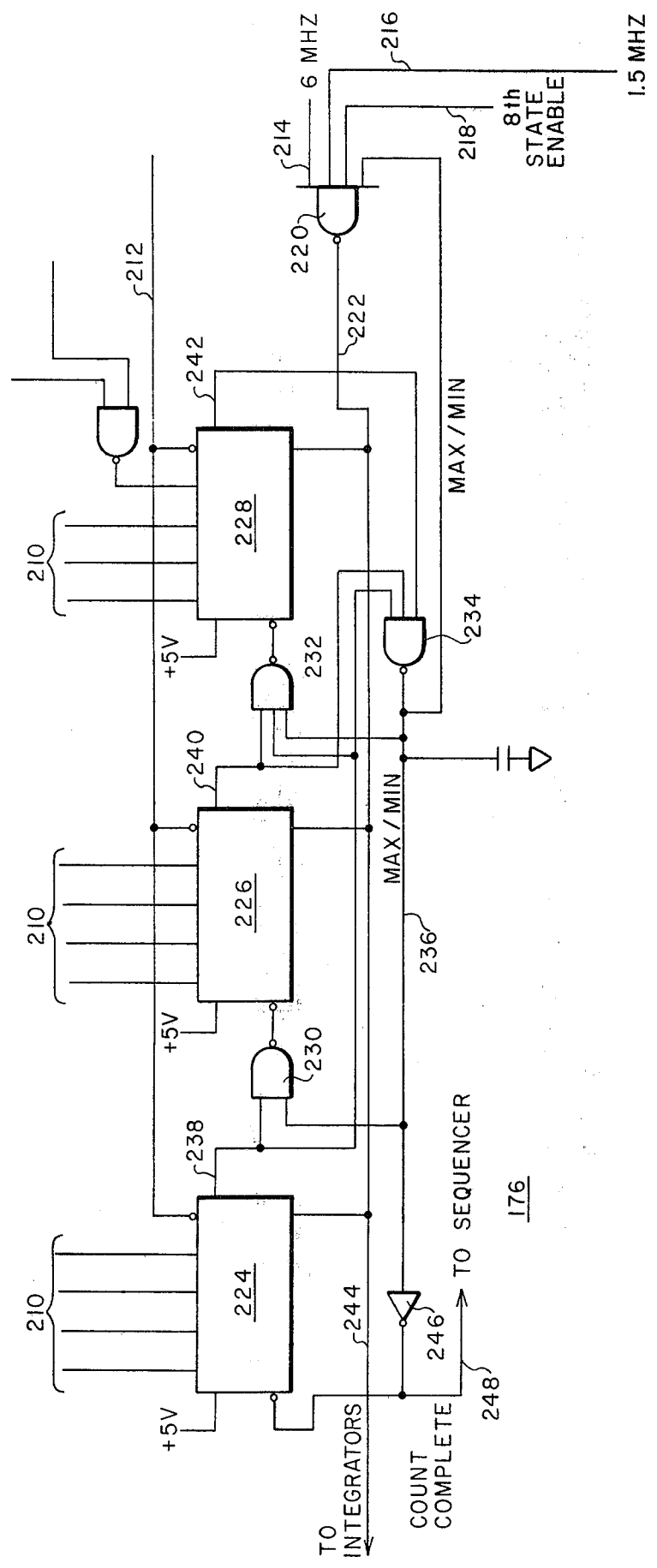
FIG. 8 is a schematic of the line length counter.

As shown in FIG. 8, the line length counter 134 receives length data on lines 210 from either the line length latch 140 or the symbology PROM 120. The data is loaded into counter 134 by a load line length counter signal appearing on line 212 from sequencer counter 124. A clock input of 6 MHz for blanked vectors and 1.5 MHz for unblanked vectors is received from clock generator 178 on lines 214 and 216, respectively. The 8th state signal from sequencer counter 120 appearing on line 218 is input to an NAND gate 220 to gate the clock signals out on line 222 to three counters 224, 226, and 228 cascaded together by NAND gates 230, 232 and 234. The output of NAND gate 234 is a max/min signal appearing on line 236 which enables succeeding counters, through NAND gates 230, 232 and 234. The max/min enable pulse is equal to slightly less than one full clock cycle providing additional set up time which allows high clock rates. This circuit configuration is known as a "look ahead" circuit.

When the contents of the line length counter are zero, the outputs 238, 240 and 242 from respective counters 224, 226 and 228 are high causing NAND gate 234 to generate a low max/min signal on line 236. The max/min signal is fed back to the input of NAND gate 220 on line 240 and when low, prevents clock outputs on line 222. If non-zero data is loaded into the counters, at least one of the output lines 238, 240 or 242 will be low causing the max/min output signal from NAND gate 234 to be high. If the clock signal is present on either line 214 or 216 and the 8th state signal is high, counters 224, 226 and 228 will begin to count down. The counters continue to count down until a zero is reached causing the max/min signal to go low. The low max/min signal prevents further clock pulses from being gated by NAND gate 220 and also generates a high signal at the output of an inverter 246 indicating that the count has been completed. This count complete signal is then sent to the mode control 182 and sequencer 124.

As the line length counter 134 counts to zero, it counts down a number of times equal to the binary number loaded into it representing vector length, and at a rate equal to 6 MHz if the vector is to be blanked or 1.5 MHz if it is to be unblanked. Counter 134 thus produces a pulse train on line 244, the number of pulses being equal to the binary representation of vector length and the frequency of which is greater for blanked vectors than for unblanked vectors. This pulse train is sent to both the x and y integrators to generate the composite deflection signals which drive the CRT displays.

The segment counters shown in FIG. 9 consist of an unblanked counter 250 and a blanked counter 252. Sequencer 176 produces either a high paint signal for unblanked vectors or a high blank signal for blanked vectors on respective lines 254 and 256 for each vector to be drawn, these lines never being high at the same time. Additionally, a dash signal from the sequencer on line 258 clocks the unblanked segment counter 250 for dashed vectors, the counter being clocked once for each dash. A signal appears on lines 260 or 262 at the outputs of respective counters 250 or 252 every time a vector is drawn. These signals will clock either unblanked counter 250 or blanked counter 252 depending upon the state of the paint and blank lines 254 and 256. Upon receipt of a master clear signal from segment decoder 180 on line 264, the contents of the counters are cleared and read out onto the internal lines of data bus 68 to be sent back to computer 62.

Figure 10:
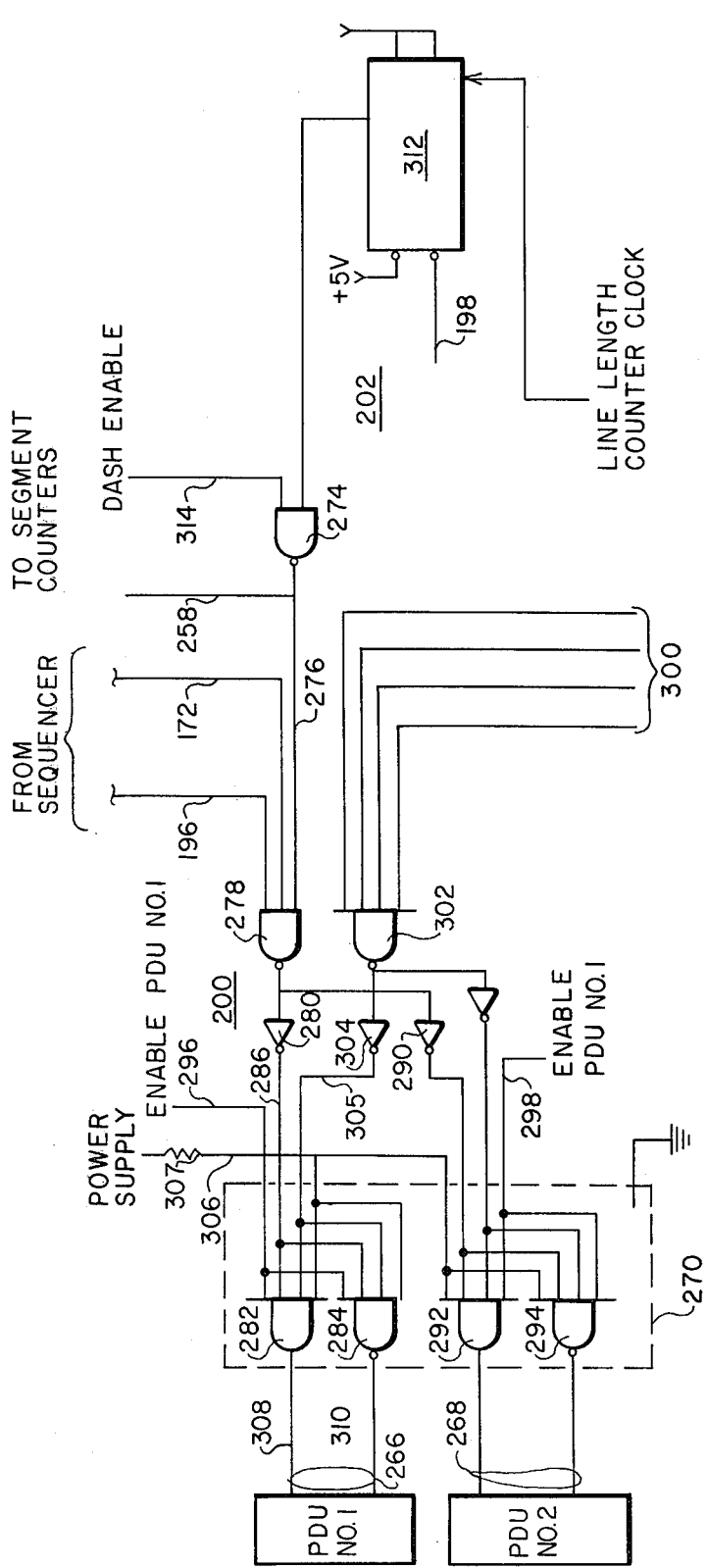
FIG. 10 is a schematic of the blanking circuit and line dash generator.

FIG. 10 is a detailed drawing of the blanking circuit 200 and line dash generator 202. Blanking signals are sent to the pilot's display units #1 and #2 on respective lines 266 and 268 via a differential line driver 270. The differential output configuration of line driver 270 is capable of driving long high capacitance lines with a low characteristic impedance and also offers additional noise immunity.

Blanking circuit 200 receives blanking information from the mode control flip/flops 182 on line 196. For unblanked vectors, the paint line 196 will be high and for blanked vectors it will be low. During the 8th state of the sequence counter 124, a high painting enable signal is transmitted on line 272 to the blanking circuit so that a vector may be drawn at this time. The blanking circuit 200 also receives an input signal from the line dasher 202 on line 276 which will be high when the vector is to be drawn unblanked. Each of the signals on lines 196, 124 and 276 are input to a NAND gate 278, the output of which is inverted by an inverter 280 and transmitted to an AND gate 282 and a NAND gate 284 for the pilot's display unit #1. The output of NAND gate 278 is also inverted by inverter 290 and sent to AND gate 292 and NAND gate 294 for the pilot's display unit #2.

The AND and NAND gates 282 and 284 associated with display unit #1 and gates 282 and 294 are associated with display unit #2 may be individually enabled so that only one of the display units is activated at a time. The enable signal for display unit #1 is present on line 296 while the enable signal for pilot's display unit #2 is present on line 298. When either of these signals is high, the corresponding display unit will be activated and when low, the display units will be disabled. The remainder of the respective blanking circuits for the display units #1 and #2 are identical so that only the circuit associated with pilot's display #1 will be described.

An overrange circuit to be described in detail below produces output signals on lines 300 which indicate whether the vectors generated are within the visible range of the display. The vectors will be in the visible region if each of the four lines 300 have a high value. If any one of these lines has a low value, the vector will be in the overrange region and will be blanked automatically. Lines 300 are input to a NAND gate 302, the output of which is inverted by an inverter 304. The output from inverter 304 is sent to AND gate 282 and NAND gate 284 on line 305 and will be high for all vectors generated in the visible region of the display. The power supply unit is connected to the video line driver 270 by line 306 through a 1K resistor 307, line 306 being high when the power is turned on.

During the eighth state generated by sequencer counter 124, the enable signal present on line 272 will be high, enabling a vector to be drawn. If the vector is to be drawn unblanked, lines 196 and 276 will also be high. The output of NAND gate 278 will thus be low and when inverted by inverter 280, a high signal is produced on line 286 and input to AND gate 282. If the vector generated is within the visible range, each of lines 300 will be high producing a low signal at the output of NAND gate 302. This low signal when inverted by inverter 304 produces a high input signal to AND gate 282 on line 305. When the pilot's display unit #1 is to be actuated, a high signal is present on line 296 and also on line 306 from the power supply. With a high signal present on each of the lines 286, 296, 305 and 306, the output of AND gate 282 is a high signal on line 308 indicating that the vector is to be drawn unblanked. Similarly, a high signal on each of the lines 286, 296, 305 and 306 input to NAND gate 284 produces a low output on the blanking line 310. If any one of lines 286, 296, 305 or 306 is low, the output on line 308 from AND gate 282 is low, whereas the output from NAND gate 284 on line 310 is high, indicating that the vector is to be generated blanked.

The line dash generator 202 includes a four-bit binary counter 312, and NAND gate 274. Counter 312 receives clock pulses from the line length counter clock to produce a dashed frequency of one dash every sixteen counts. A signal on the dash synch line 198 from the mode control flip/flop 182 resets counter 312 before every vector writing sequence so that the dash counter always starts from zero, ensuring that the number of dashes remains constant for a given length. The dash frequency produced by counter 312 is gated at NAND gate 274 by a dash enable signal 314 from the sequencer 176. The output from NAND gate 274 is a periodic high/low signal for producing dashes. This output signal from the line dash generator on line 276 periodically gates NAND gate 278 to produce a dashing effect for the vectors to be drawn. This periodic signal is also sent on line 258 to the segment counters 192 as described above.

Figure 11:
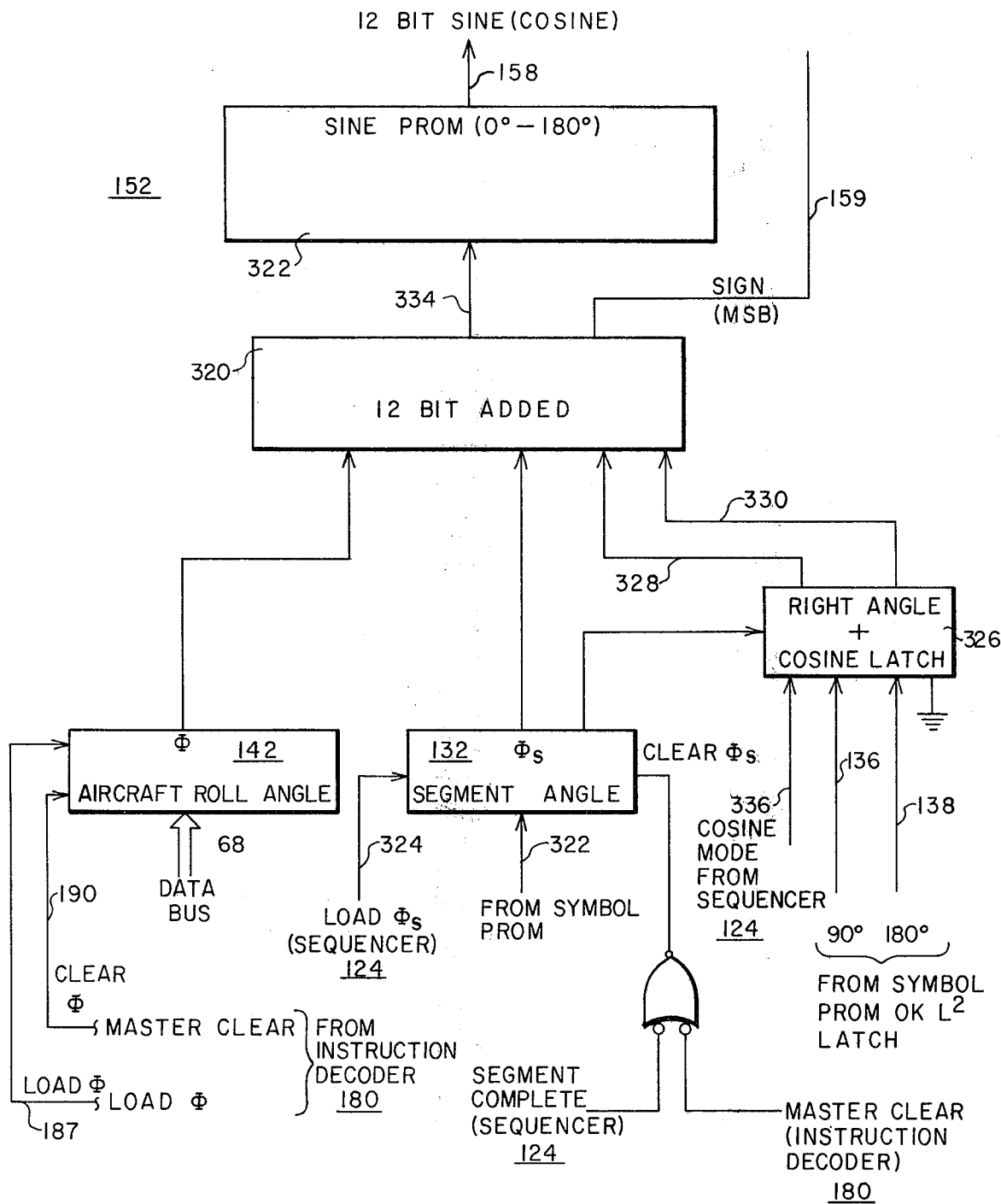
FIG. 11 is a block diagram of the sine/cosine converter and rotate adder.

Rotation of a symbol will be described in conjunction with FIG. 11. A rotate adder 320 digitally adds the binary representation of an angle, as the aircraft roll angle, held in the $\Phi$ latch 142 and the binary representation of the segment angle, $\Phi_s$, held in the segment angle latch 132 to provide rotation of the symbology. Upon receipt of the load $\Phi$ signal from the sequence decoder 180 on line 187, angle data from computer 62 is transferred from bus 68 to the Φ latch 142. Angle data from the symbology PROM 120 on bus 322 is transferred to the segment angle latch 132 upon receipt of a load $\Phi_s$ signal on line 324 from the sequencer counter 124. The binary numbers stored in the Φ latch 142 and the segment angle latch 132 are digitally added by rotate adder 320, the output of which is a digital number having a binary representation equal to the actual angle of the vectors to be displayed.

Where a vector is specified by a single instruction utilizing right angle data, a right angle and cosine latch 326 receives angle data instead of the segment angle latch 132. The right angle and cosine latch 326 is a digital adder which receives input signals on lines 136 and/or 138 representing 90° and 180° respectively depending upon the right angle data from the line length latch 140 or the symbology PROM 120. The outputs from latch 326 on lines 328 and 330 represent either 90°, 180° or 270° and are input to rotate adder 320 to be digitally added with the binary representation of the aircraft roll angle held in latch 142.

In order to derive x and y axis deflection signals, the sine/cosine converter 152 including a sine PROM 332 is utilized to produce the sine and the cosine values of the actual vector angle. The numbers stored in sine PROM 332 are 12-bit binary representations of the sine of the actual vector angle. From FIG. 12A it is seen that the sine of the angles from 0°-180° (0-2048 decimal as shown in parentheses) have the same values as the sine of angles from 180°-360°. The only difference is that the sine values are positive for angles between 0° and 180° and negative for angles between 180° and 360°. Thus, only the sine of angles from 0°-180° need be stored in PROM 332. The sine PROM is addressed by the 11 least significant bits from rotate adder 320, the output of which will be the same for angles from 0°-180° and the corresponding angles from 180°-360°. The most significant bit of rotate adder 320 corresponds to sign. When the most significant bit is 0, a low signal is present on line 159 indicating a positive sign and when 1, a high signal is present on line 159 indicating a negative sign.

Figure 12:
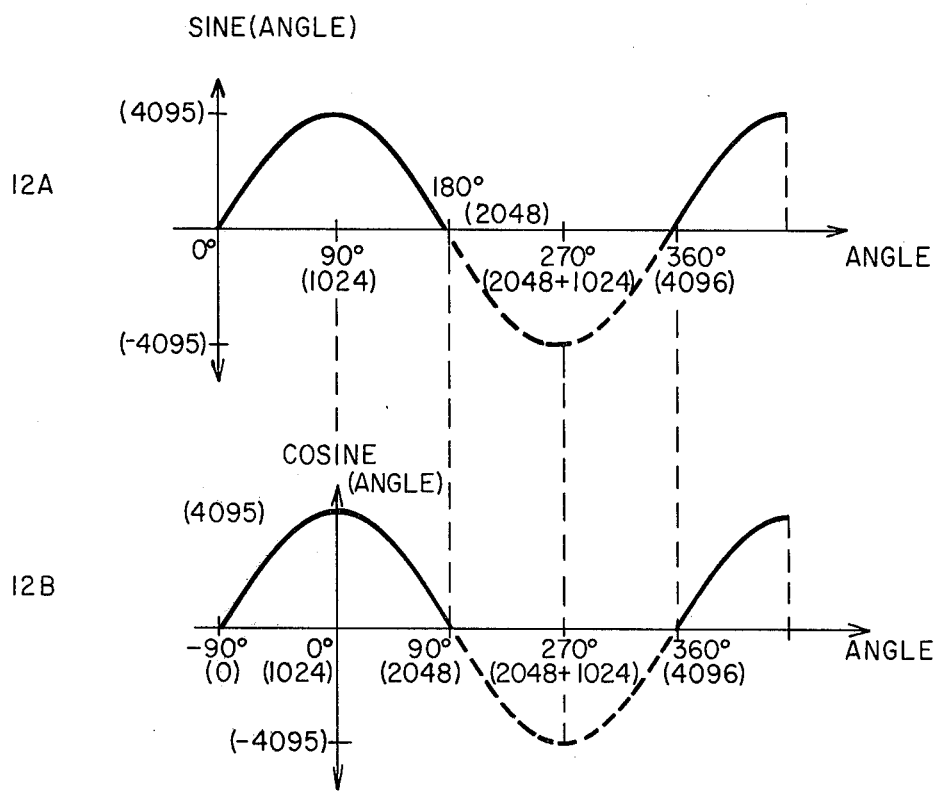
FIG. 12A-B is a graphical illustration of the sine and cosine waveforms.

As seen from FIGS. 12A and B, 12B corresponding to the cosine function, sin (Φ) has the same value as cos (Φ+90°). Thus, if a binary representation of 90° is added to the binary representation of the actual angle stored in rotate adder 320, the resulting sum will form the address of sine PROM 332, the output of which will be the cosine of the actual angle. When line 336 has a high signal indicating the cosine mode, the right angle and cosine latch 326 outputs a digital representation of 90° which is added to the values stored in rotate adder 320. The binary number output from adder 320 on line 334 will now correspond to the actual angle plus 90° so that the output of sine PROM 332 will be the cosine of the actual angle. The sine and cosine values of the actual vector angle are sent to the x and y integrators 154 and 156 on bus 158.

Figure 13:
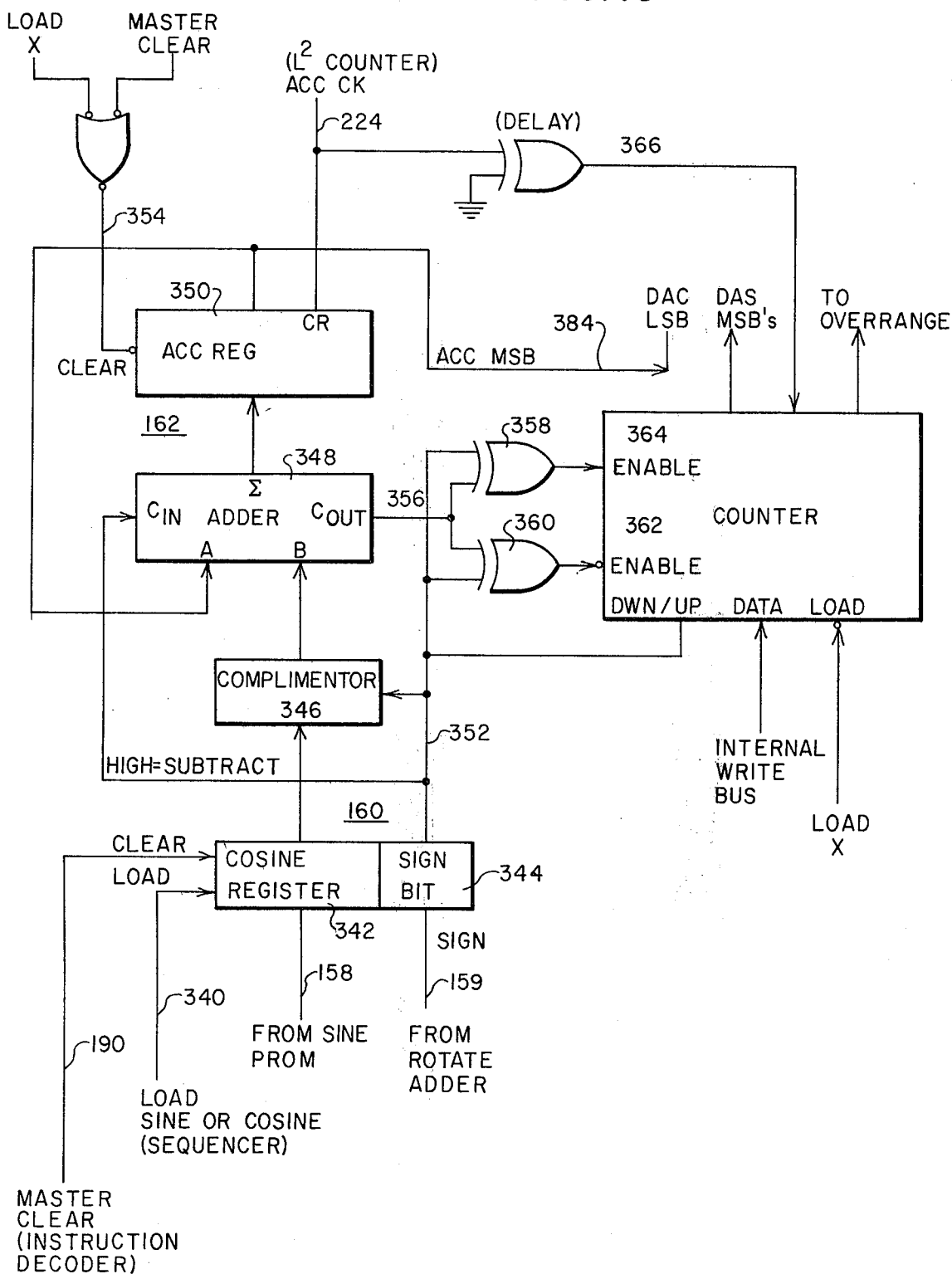
FIG. 13 is a block diagram of the x axis integrator.

The x integrator 154 and the y integrator 156 are identical so that only the x integrator will be described in conjunction with FIG. 13. Upon receipt of a load cosine signal on line 340 from sequencer counter 124, the 12-bit output from the sine/cosine converter on line 158 is loaded into latch 342 and the sign signal on line 159 is loaded into bit 344 of cosine latch 160. The cosine data is either added or subtracted in an accumulator circuit 162 consisting of a complementer 346, an adder 348, and an accumulator register 350 depending upon the value of the sign bit 344. For addition, line 352 is low, indicating a positive sign, and the cosine data from latch 342 is passed by complementer 346 to adder 348. When the sign bit 344 is 1, a high signal is present on line 352 and complementer 346 produces the two's complement of the number held in cosine register 342. Subtraction is accomplished by adding the two's complement from complementer 346 in adder 348. The results of the adding or subtracting are held in the accumulator register 350.

The accumulator register 350 receives the pulse train generated by the line length counter 144 on line 244. The pulse train clocks the accumulator register once for each count length of the vector to be drawn. Until receipt of a master clear signal on line 354 from the sequence decoder 180, the accumulator register 350 keeps a running sum of the adder data. The carriers 356 or borrows out if subtraction was performed by adder 348 are delayed by delays 358 and 360 to enable the up/down counter 164. If a high signal is present on line 352 indicating subtraction, counter 164 is enabled at terminal 326 to count down. If line 352 is low, counter 164 is enabled at terminal 364 to count up. The pulse train generated by line length counter 134 passes through a delay 366 on line 368 and is used to clock counter 164.

$X_0$, the x coordinate of the symbology starting point, is loaded into counter 164 from bus 68 upon receipt of the load $x_0$ signal from sequence decoder 180. The load $x_0$ signal is only present for the first vector to be drawn in the entire symbology when the symbols are drawn in linked sequence. Thereafter, the starting point of each subsequent vector is the end point of the previous vector which is held in counter 164. Symbols may be drawn in a random sequence by using the load $x_0$ and load $y_0$ instructions to establish the starting point for each symbol.

Figure 14:
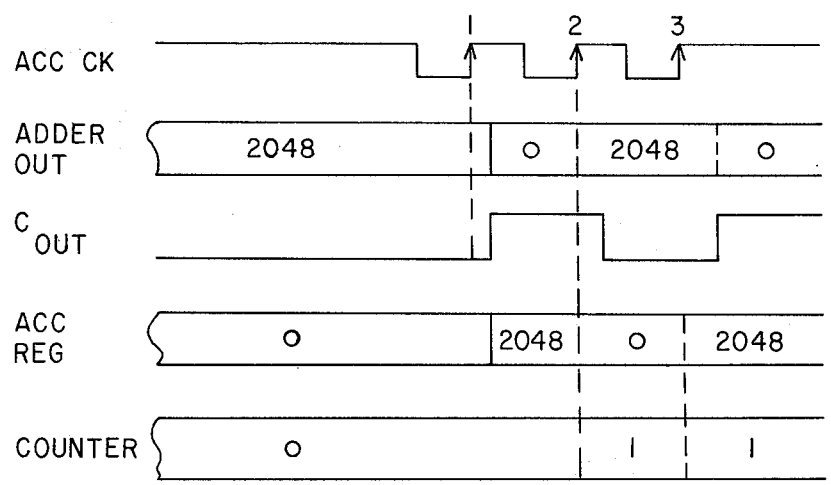
FIG. 14 is a timing diagram of the integrator.

An example of the operation of the integrators will now be given in conjunction with FIG. 14. If the accumulator register 350 and up/down counter 164 initially contain zero and a digital number having decimal value of 2048 with a positive sign is loaded into latch 160, then on the first accumulator clock pulse from line 244, the accumulator register 350 will contain 2048. After a short propagation time, the output of adder 348 on line 369 will be 0 and the carryout 356 will be high. On the second clock pulse, the accumulator register 350 becomes 0 and counter 164 is incremented by 1. After a further short propagation time, the output of adder 348 and 2048 and carryout 356 is low. This process can be extended indefinitely, limited only by the maximum counter value.

Figure 15:
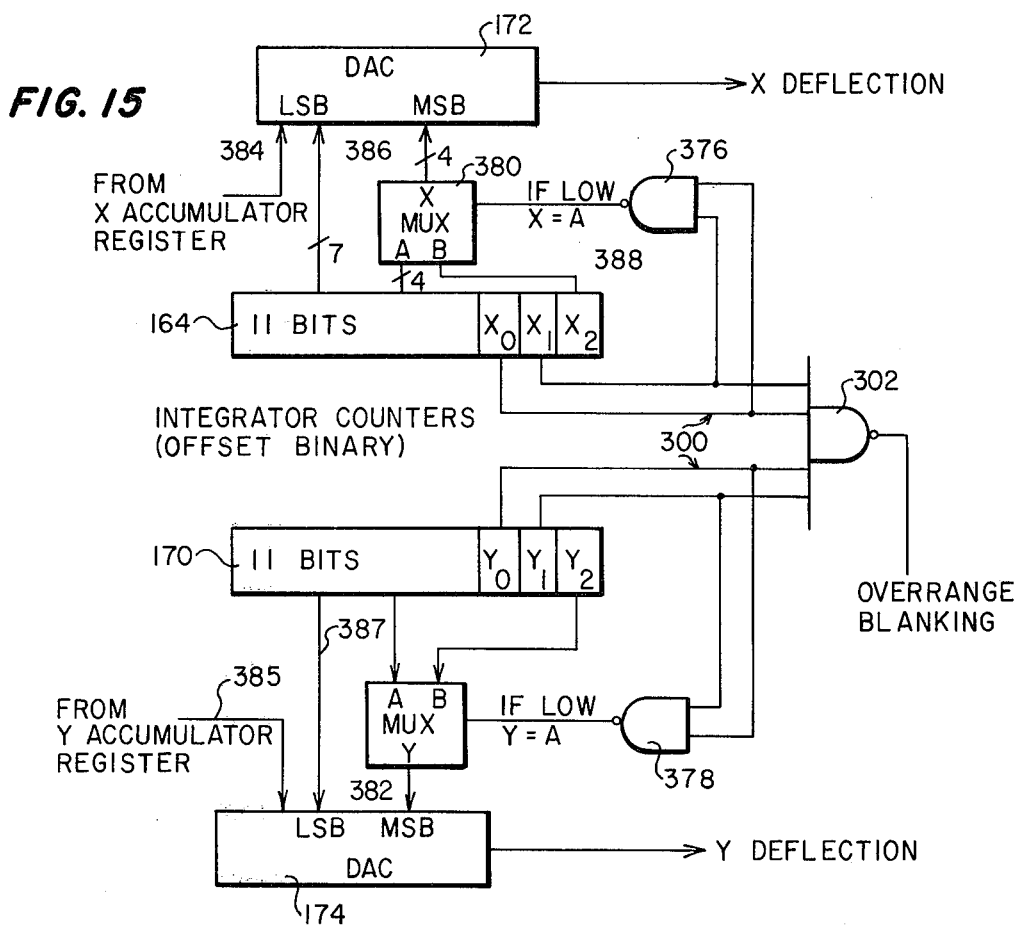
FIG. 15 is a schematic of the overrange circuit.
Figure 16:
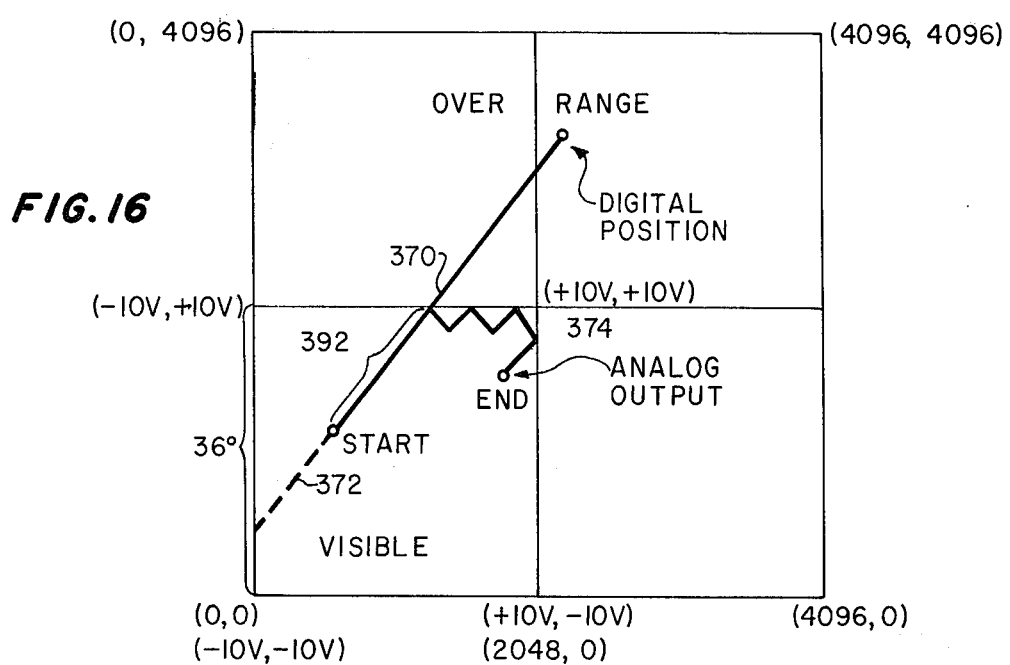
FIG. 16 is a graphical illustration of a vector in the overrange area.

In order to draw symbols partially outside the visible region of the display, an overrange circuit is provided in the digital integrators 154 and 156 as seen in FIG. 15. The deflection output range of the digital to analog converter is between 30 10 V DC and −10 V DC. This corresponds to an optical range of 36° and 2048 decimal as seen in FIG. 16. Since the representation of vector length is made on the basis of 4096 counts equal 72°, it is possible to draw outside the visible region as seen by the dashed portion of line 370.

In digital terms, the symbols are developed in the overrange region. In analog form, they are modified. The up/down counters 164 and 170 are made two or three bits wider. A corresponding increase in the range of the digital to analog converters is very costly and presents problems with accuracy and resolution. Therefore, the total range of the analog output is increased by only 20% more than the maximum range required by the optics of display unit 66. If line 370 is now drawn outside the visible range, as shown as the line reaches the right-hand limit, the digital to analog converters jump from +10 V DC to −10 V DC and start over until the upper limit is again reached. This effect is called "wrapping around", and is shown by the dashed line 372. Upon reaching the outside limit, the display is blanked so that when the line jumps to −10 V, it is invisible although it is being drawn in the visible region.

This approach works well except when interfaced with relatively slow deflection systems typically used in headup display units. When the analog output from the digital to analog converters jumps from +10 V to 31 10 V at the edge of the visible region, the deflection system cannot follow the jump immediately, and it will take typically 100 to 150 μsec until the CRT beam reaches the left-hand corner of the display. The jump to the left side of the display may also prevent the beam from reaching the right edge of the visible range in time to draw the next visible lines, thus distorting the display at the edge of the visible region. In order to prevent this distortion, the digital to analog converter output is prevented from jumping from 30 10 V DC to −10 V DC by manipulating the four most significant bits of the integrator up/down counters such that the analog output will jump only 1/16th of the total range whenever the digital output is outside the visible region. This effect is called "warping", and is shown by lines 374.

The up/down counters 164 and 170 are 14-bit digital counters. The three most significant bits of each counter are used to supply the overrange capability which results in warping. To be drawn in the 36° visible portion of the display, bits $y_2\ x_2\ y_1\ x_1\ y_0\ x_0$ must be equal to 001111. Vectors having different values for these bits will automatically be blanked. The bits associated with $x_0, x_1, y_0$ and $y_1$ are sent on lines 300 to NAND gate 302. When each of these bits has a value of 1, the line is in the visible region and the output of NAND gate 302 will be 0. When any of these bits has a value of 0, the output from NAND gate 302 will be high and is sent to the overrange blanking circuit to blank that portion of the vector outside the visible region as described in conjunction with FIG. 10.

Bits $x_0, x_1, y_0$ and $y_1$, are also sent to NAND gates 376 and 378 and if each bit has a value of 1, the output from NAND gates 376 and 378 will be low. Multiplexers 380 and 382 are utilized so that upon receipt of a low signal from NAND gates 376 and 378, the four most significant bits of the 11 least significant bits of counters 164 and 170 are passed to the most significant bits of the digital to analog converters 172 and 174. The least significant bits of the digital to analog converters are comprised of the most significant bit from the accumulator registers on lines 384 and 385 and the seven least significant bits from counters 164 and 170 on lines 386 and 387.

If the output from either NAND gate 376 or 378 is high indicating one of the bits $x_0, x_1, y_0$ or $y_1$ has a value of 0, the multiplexers 380 and 382 set the four most significant bits of digital to analog converters 172 and 174 equal to the value of $x_2$ and $y_2$ from lines 388 and 390, respectively. Since the eight least significant bits of the digital to analog converters can still change, the analog output is warped rather than wrapped around, resulting in the output 374 shown in FIG. 16. Line 374 is automatically blanked by the high signal from NAND gate 302 so that only that portion 392 of line 370 is visible.

Figure 17:
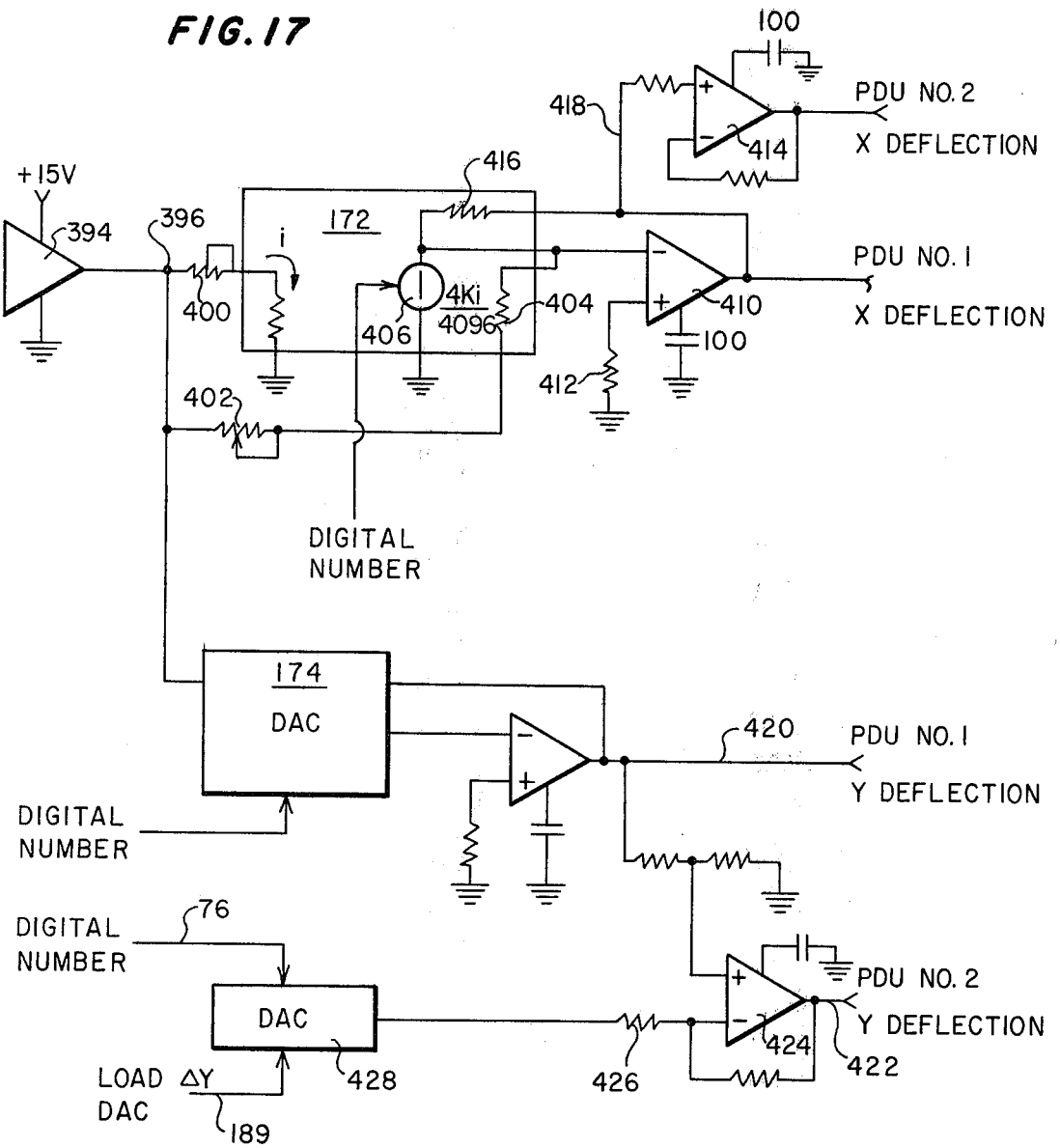
FIG. 17 is a schematic of the analog output circuit.

The analog output circuit for the symbol generator is shown in FIG. 17. A +15 V from the power supply to an op amp 394 provides a +10 V reference at node 396 for the digital to analog converters 172 and 174. This reference voltage is internally converted to a reference current, i. A resistor 398 supplies a 10 V offset voltage to the circuit resulting in the offset binary coding of the outputs. A potentiometer 400 adjusts the gain of digital to analog converter 172 and a second potentiometer 402 in series with a 4K resistor 404 adjusts the DC offset. The 12-bit digital number, the least significant bit from the accumulator register 350 and the 11 most significant bits from the digital up/down counter 154, is input to a current source 406. The output of digital to analog converter 172 on line 408 is a current proportional to the digital input by a factor 4Ki/4096.

The output on line 408 is connected to the negative input terminal of an op amp 410, the positive terminal of which is grounded through a resistor 412. Op amps 410 and 414 act as current to voltage converters and feature high speed and low output impedance for line driving. The output from op amp 410 is fed back to the current source 406 through a 4K resistor 416 and also supplies the input to the positive terminal of op amp 414 through a resistor 418. Op amp 414 is a follower and provides the deflection voltage for the second pilot's display unit whereas op amp 410 provides the deflection voltage for the first pilot's display unit. Each of the op amps 410 and 414 are compensated by a 100 pf capacitor to assure stability.

The analog output circuit which provides the y deflection voltages on line 420 and 422 for the first and second pilot display unit, are identical to those just described for the x deflection voltages. The only difference is that the following op amp 424 for the second polot display unit receives an offset input through a resistor 426 to its negative terminal from a digital to analog converter 428. A digital number representing the pitch offset of the second display unit with relation to the first display unit is loaded into digital to analog converter 428 upon receipt of the load Δy instruction from sequence decoder 180, whereupon converter 428 sums a signal into the deflection signal for the y axis of the second pilot display unit.

Figure 18:
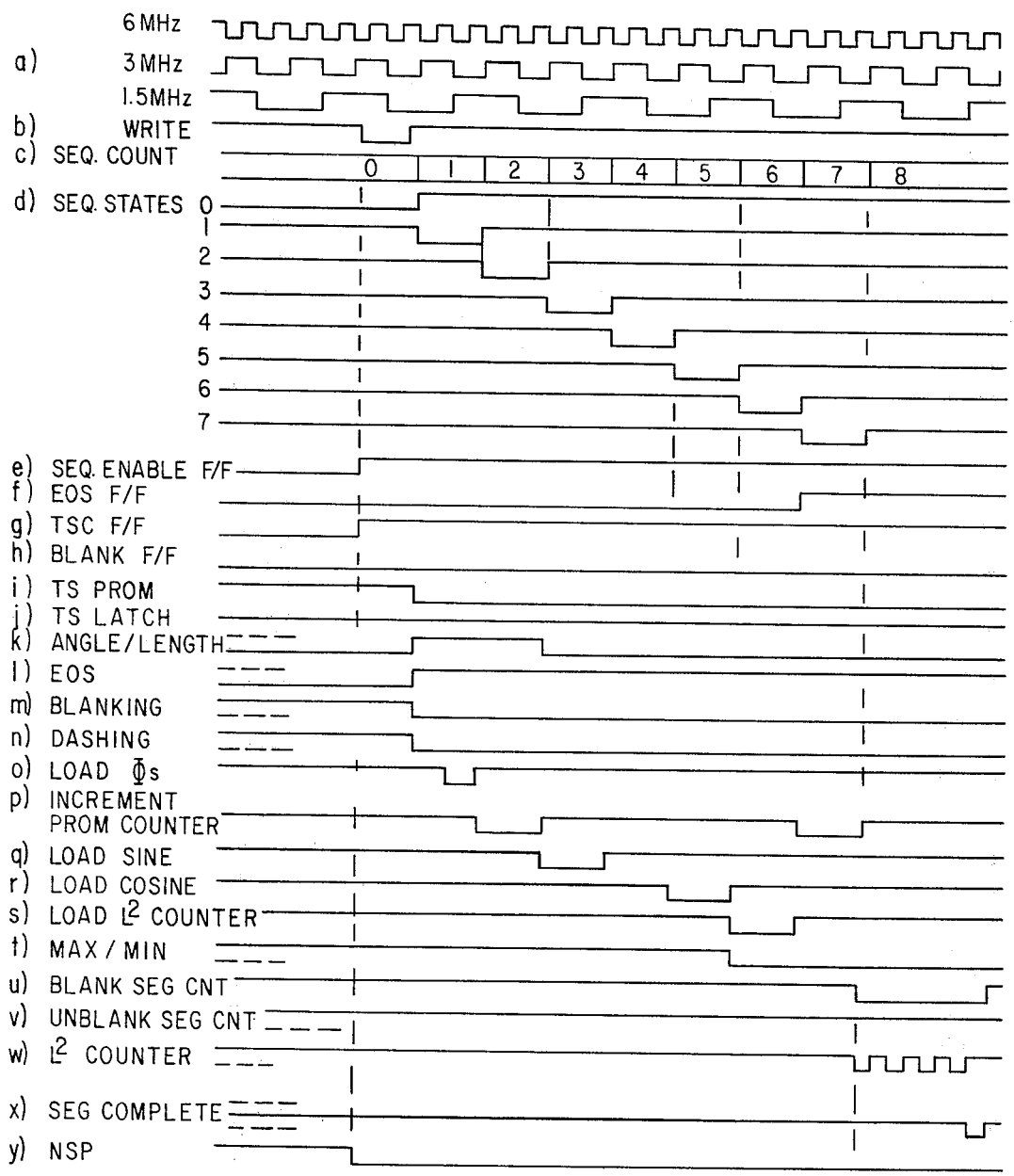
FIG. 18 is a timing diagram illustrating the operation of the symbol generator.

The operation of sequencer 176 will now be described in conjunction with FIGS. 6A, 6B and the timing diagram of FIG. 18. FIGS. 18a–y depict the sequence that occurs when a symbol is drawn from the symbology PROM 120 via the load PROM counter instruction on line 188 from the sequence decoder 180. The timing of the sequencer 176 is controlled by the master clock generator 178 which generates the clock pulses shown in FIG. 18a, the first of which is a 6 MHz signal for blanked vectors; the second is a 3 MHz signal for the sequencer counter 124 logic; and the third is a 1.6 MHz signal for unblanked vectors.

A master clear signal is sent on line 190 from sequence decoder 180 before vector writing is begun to reset all of the mode control flip/flops 182 and all of the counters and latches in the symbol generator. Before the write signal 18b goes low, the sequencer counter 124 is holding in state 0 18d. This is caused by a low sequence enable flip/flop signal 18e from mode control flip/flop 182. A low 0 state signal 18d0 from counter 124 causes the symbology PROM signal 18i and line length latch 18j signal to the tristate and also resets the line dash generator counter 312 via the dash sync line 198.

The following description is for a load PROM instruction. The operation with a load line latch instruction is similar. Upon receipt of the write signal, sequence decoder 180 decodes the address instruction input from computer 62 on bus 67 and issues the load PROM counter signal on line 188 whereupon the address of the symbol to be drawn is loaded from bus 68 into PROM address counter 122. A low write signal 18*b* causes the sequence enable 18*e* and the tristate control flip/flop signal 18*g* of mode control 182 to go high, the NSP flip/flop signal 18*y* going low asynchronously. The sequencer counter 124 remains inhibited until the write signal 18*b* goes high on the occurrence of the first rising edge of the 3 MHz clock signal. The sequence counter 124 then begins to count to state 1. The angle/length signal 18*k* from the symbology PROM 120 is high, indicating the first PROM word is an angle so that the sequencer counter 124 sends a load $\Phi_s$ pulse 18*o* to the segment angle latch 132 to load the vector angle data.

The count proceeds to state 2 during which sequencer counter 124 sends a clock pulse 18*p* to the PROM address counter 122 incrementing the counter to the next address which will be associated with a PROM data word consisting of lenghth information. In state 3, a clock pulse 18*q* is sent to the sine latch 166 to load the value of the sine of the actual angle from the sine/cosine converter 142. The count then proceeds to state 4 where no action is taken. In state 5, the cosine mode signal 18*r* is sent to the sine/cosine converter 152 to initiate the cosine mode and it is also sent to the cosine latch 160 to load the resulting cosine value of the actual angle.

During state 6 a pulse 18*s* is sent to load the line length counter 144 with length data from symbology PROM 120. This causes the max/min signal 18*t* to go low, assuming the length data is not zero. State 6 also clocks the blank and EOS flip/flop signals 18*h* and 18*f*, respectively. Since the PROM blanking signal 18*m* is low, indicating a blanked vector, the blank flip/flop 18*h* maintains a low state. The low at the paint signal on line 196 of the blank flip/flop assures that the video signals will be blanked by the blanking circuit 200 and that the 6 MHz vector writing clock will be selected. The PROM EOS signal 181 is high so that the EOS flip/flop assumes a high state 18*f* indicating that the last word of the symbol has not been reached. During state 7 since a high EOS flip/flop signal 18*f* is present, the PROM address counter 122 is incremented by signal 18*p* to the address of the data words stored in PROM 120 associated with the second vector comprising the symbol.

The count then proceeds to state 8, during which the sequencer counter 124 is forced to hold until it can be synchronously reloaded. The state 8 signal clocks the blanked segment counter 192 by pulse 18*u* and also enables NAND gate 278 for unblanked and dashed vector writing. In this case, the paint signal 18*v* on line 196 is low, holding the output of NAND gate 278 so that the vector will be blanked. During state 8, the line length counter 144 also starts counting down to zero, generating the pulse train 18*w* which is sent to both the x and y integrators on line 244. State 8 continues and the integrators draw the vector. After four pulse counts 18*w* of the 6 MHz clock, the max/min output 18*t* goes high inhibiting the line length counter 134 and indicating the vector is completed. A low going segment complete signal 18*x* is produced on line 248 which enables the load control of the sequencer counter 124 and clocks the NSP flip/flop. Since the EOS flip/flop 18*f* is high indicating this is not the last vector of the symbol, NSP signal 18*y* remains low.

The sequence enable signal sets up sequencer counter 124 for another sequence. The sequencer counter 124 again resumes the 0 state and the sequence of occurrence described above continues. When the EOS flip/flop goes low indicating the last vector of the symbol has been detected, a high NSP signal is sent back to computer 62 on line 82 to request the next writing instruction.

The foregoing detailed description is given for clearness of understanding only and no unnecessary limitations should be understood therefrom, as modifications will be obvious to those skilled in the art.

I claim:

1. In a digital symbol generator for developing analog deflection signals to drive a cathode ray tube display forming a symbology by tracing a plurality of blanked and unblanked symbols, an improved processing means operating on a constant program path having a plurality of program instructions upon execution of which said processing means provides selected input information to said symbol generator defining the position of each of said symbols and specifying those symbols to be traced unblanked, comprising:
   means for executing each of said program instructions in a fixed sequence during each iteration of said symbol generator to develop input information for all symbols; and
   means for conditionally loading selected input information corresponding to those symbols forming a symbology into an output register to be transmitted to said symbol generator.

2. In a digital symbol generator for developing analog deflection signals to drive a cathode ray tube display forming a plurality of symbols by tracing successive vectors, the starting point of a vector being equal to the end point of the previous vector traced, a symbol error checking device comprising:
   means for measuring the symbology end point of the last vector generated from the analog deflection signal;
   means for converting the symbology end point to a digital value;
   processing means for calculating a true end point by digital vector addition of each successive vector generated;
   means for comparing the digital value of the symbology end point with the digital sum representing the true end point; and
   means for displaying an indication of error on said cathode ray tube display if the symbology end point is not equal to the true end point.

3. In a digital symbol generator for developing analog deflection signals to drive a cathode ray tube display for tracing a vector having specified angle and length information, said information combined in a digital integrator including a counter having a plurality of bits, the digital output of said counter being input to and converted by a digital to analog converter to develop the analog deflection signals, said converter having operating limits corresponding to the visible region of said display, an improved overrange means for warping the analog deflection signals corresponding to that portion of a vector outside the visible region of the display comprising:

means for comparing the contents of the most significant bits of said counter for determining whether the vector to be traced is within the visible region of said display; and multiplexing means for setting the most significant bits of said input to the converter equal to the corresponding most significant bits of said counter if the vector is within the visible region and setting each of said most significant input bits equal to the value of the very most significant bit in said counter if said vector is not within the visible region.

4. The digital symbol generator of claim 3 wherein the overrange means includes blanking means to blank that portion of the vector having a warped analog deflection signal.

5. In a digital symbol generator for developing analog deflection signals to drive a cathode ray tube display forming a symbology including a plurality of symbols and connecting vectors, an improved means for generating and checking said symbology by tracing a plurality of successive vectors forming a symbol, upon completion of which, tracing a connecting vector having variable orientation and length to connect said symbol with the next successive symbol forming said symbology, comprising:

means for storing data defining each successive vector forming a symbol;

a source of digital input data defining each connecting vector;

vector generating means responsive to said stored vector data and to said connecting vector data for developing analog deflection signals;

sequencer means for sequentially loading vector data for each successive vector forming a symbol into said vector generating means from said storage means, the end point of one vector being the starting point of the next successive vector, and upon completion of the last vector forming said symbol, loading said connecting vector data from said source of digital input data into said vector generating means, the end point of said last vector forming said symbol being the starting point of said connecting vector and the end point of said connector vector being the starting point of the next successive symbol forming the symbology; and symbol error checking means responsive to the analog deflection signal representing the end point of the last vector generated for determining the occurrence of an error in the generated symbology.

6. The digital symbol generator of claim 5 wherein said symbol error checking means includes:

means for converting the analog deflection signal representing the end point of the last vector generated into a digital value;

processing means for calculating a true end point by digital vector addition of each successive vector generated forming a symbol and each connecting vector; and means for comparing the digital value of the symbology end point with the digital sum representing the true end point.

* * * * *